US009858655B2

(12) United States Patent
Jiang et al.

(10) Patent No.: US 9,858,655 B2
(45) Date of Patent: Jan. 2, 2018

(54) METHOD AND APPARATUS FOR VIDEO ANTI-SHAKING

(71) Applicant: Nokia Technologies Oy, Espoo (FI)

(72) Inventors: An Jiang, Beijing (CN); Feng Cui, Beijing (CN); Haitao Zhu, Beijing (CN); Yan Wang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/023,365

(22) PCT Filed: Sep. 18, 2014

(86) PCT No.: PCT/FI2014/050714
§ 371 (c)(1),
(2) Date: Mar. 18, 2016

(87) PCT Pub. No.: WO2015/044518
PCT Pub. Date: Apr. 2, 2015

(65) Prior Publication Data
US 2016/0205323 A1 Jul. 14, 2016

(30) Foreign Application Priority Data

Sep. 29, 2013 (CN) .......................... 2013 1 0456910

(51) Int. Cl.
*G06T 5/50* (2006.01)
*G06K 9/62* (2006.01)
(Continued)

(52) U.S. Cl.
CPC .............. *G06T 5/50* (2013.01); *G06K 9/6218* (2013.01); *G06T 5/002* (2013.01); *G06T 5/10* (2013.01);
(Continued)

(58) Field of Classification Search
CPC ...... H04N 19/527; H04N 19/61; H04N 5/145; H04N 5/23248; H04N 15/23254; H04N 19/51; G06T 7/2013; G06T 7/20
See application file for complete search history.

(56) References Cited

U.S. PATENT DOCUMENTS 6,600,784 B1 * 7/2003 Divakaran ........ G06F 17/30781
348/416.1
6,628,711 B1 * 9/2003 Mathew ................... H04N 5/21
348/208.3
(Continued)

FOREIGN PATENT DOCUMENTS

CN 101202911 A1 6/2008

OTHER PUBLICATIONS

International Search Report and Written Opinion received for corresponding Patent Cooperation Treaty Application No. PCT/FI2014/050714, dated Jan. 28, 2015, 15 pages.
(Continued)

*Primary Examiner* — Edward Park
(74) *Attorney, Agent, or Firm* — Alston & Bird LLP

(57) ABSTRACT

Embodiments of the present invention relate to method and apparatus for video anti-shaking. There is disclosed a method for use in a video anti-shaking, especially for real-time digital image stabilization, the method comprises: dividing at least one part of a current frame of a video into a plurality of regions (S301); performing a progressive local motion detection for each of the plurality of regions to determine a local motion vector for the region (S302, S303, S304); and determining a global motion vector for the current frame based on the local motion vectors for the plurality of regions (S305). There is also described a corresponding apparatus and user equipment. With embodiments of the present invention, the video anti-shaking processing can be done without any additional hardware. Moreover,
(Continued)

embodiments of the present invention may quickly and effectively determine a motion vector and corresponding compensation.

17 Claims, 5 Drawing Sheets

(51) Int. Cl.
    *H04N 5/232*     (2006.01)
    *G06T 5/00*     (2006.01)
    *G06T 5/10*     (2006.01)
    *G06T 7/223*     (2017.01)
    *G06T 7/238*     (2017.01)

(52) U.S. Cl.
    CPC .............. *G06T 7/223* (2017.01); *G06T 7/238* (2017.01); *H04N 5/23254* (2013.01); *H04N 5/23277* (2013.01); *G06T 2207/10016* (2013.01); *G06T 2207/20021* (2013.01); *G06T 2207/20064* (2013.01); *G06T 2207/20201* (2013.01)

(56) References Cited

U.S. PATENT DOCUMENTS

| | | | |
|---|---|---|---|
| 2005/0163348 A1 | 7/2005 | Chen | |
| 2008/0112630 A1 | 5/2008 | Nestares et al. | |
| 2009/0304090 A1* | 12/2009 | Cordara | H04N 19/537 375/240.26 |
| 2010/0316126 A1* | 12/2010 | Chen | H04N 19/124 375/240.16 |
| 2013/0069935 A1* | 3/2013 | Liu | G06T 7/0071 345/419 |
| 2014/0185938 A1* | 7/2014 | Tamayama | H04N 19/527 382/195 |

OTHER PUBLICATIONS

Yun, K. et al, "Probabilistic Approach with Three Hierarchies of Motion Estimation for Video Stabilization". 2011 International Conference on Digital Image Computing Techniques and Applications (DICTA) [online], Dec. 6, 2011 [retrieved on Jan. 26, 2015], pp. 262-267. Retrieved from the internet <URL:http//ieeexplore.ieee.org/xpl/articleDetails.jsp?arnumber=6128692><DOI:10.1109/DICTA.2011 .50> the whole document.

Liu, L. et al. "Fast Global Motion Estimation". IEEE International Conference on Broadband Network & Multimedia Technology (IC-BNMT '09)[online], Oct. 18, 2009 [retrieved on Jan. 26, 2015], pp. 220-225. Retrieved from the internet: <URL: http//ieeexlore.ieee.org/xpl/articleDetails.jsp?arnumber=5348470><DOI: 10.1109/ICBNMT.2009.5348470>.

Ren, G et al. "A Novel Hybrid Coarse-to Fine Digital Image Stabilization Algorithm". Information Technology Journal [online], Jun. 23, 2010 [retrieved on Jan. 26, 2015]. vol. 9 No. 7 1390-1396. Retrieved from Internet: <URL: http://scialert.net/gredirect.php?doi-itj.2010.1390.1396&linkid=pdf> <DOI:10.3923/itj.2010.1390.1396>the whole document.

Pizurica, A, et al. "Adaptive Probabilistic Wavelet Shrinkage for Image Denoising", Ghent University technical report [online], Jul. 2004 [retrieved on Jan. 25, 2015]. Retrieved from the Internet <URL:http://telin.urgent.be/~sanja/Papers/ProbShrinkReport.pdf>.

Office Action for Chinese Application No. 201310456910.6 dated Mar. 10, 2017, 11 pages.

Donoho D L; "De-Noising by Soft-Thresholding"; IEEE Transactions on Information Theory; IEEE Press,USA; vol. 41, No. 6; May 1, 1995; pp. 613-627; XP002971195.

Extended European Search Report from corresponding European Patent Application No. 14848246.6 dated Mar. 29, 2017.

Liao Jiawen et al.; "Research and Approach on Video Stabilization Algorithm"; Image Analysis and Signal Processing; 2012 International Conference on, IEEE; Nov. 9, 2012; pp. 1-4; XP032322176.

Tajbakhsk Touraj; "<title>Real-time Global Motion Estimation for Video Stabilization</title>"; Proceedings of Spie; vol. 7244; Feb. 4, 2009; p. 72440B; XP055150602.

Juanjuan Zhu et al.; "A Panoramic Image Stabilization System Based on Block Motion Iteration"; Intelligent Systems and Design and Applications, 2008 ISDA '08; Eighth International Conference on, IEEE, Piscataway, NJ; Nov. 26, 2008; pp. 473-477; XP031368538.

Office Action for Chinese Application No. 201310456910.6 dated Sep. 30, 2017, with English summary, 6 pages.

* cited by examiner

METHOD AND APPARATUS FOR VIDEO ANTI-SHAKING

RELATED APPLICATION

This application was originally filed as Patent Cooperation Treaty Application No. PCT/FI2014/050714 filed Sept. 18, 2014 which claims priority benefit to Chinese Patent Application No. 201310456910.6, filed Sept. 29, 2013.

FIELD OF THE INVENTION

Embodiments of the present invention relate to video processing, and more specifically, relate to method and apparatus for video anti-shaking.

BACKGROUND OF THE INVENTION

With the development of video capture and processing technologies, more and more devices have a video capture function. For example, most current portable mobile devices (e.g., mobile phone, personal digital assistant PDA, tablet computer, etc.) are all equipped with a camera capable of capturing video. During the process in which a user captures a video, in particular, when capturing video in mobility, shaking of the camera will cause a jitter phenomenon in the captured video, which results in degradation of video quality. To this end, video quality is usually improved through anti-shaking processing. Generally, an objective of video anti-shaking processing is generating a compensated video, such that undesired jitter between video frames is alleviated or eliminated in the compensated video.

Some video anti-shaking solutions are based on hardware. For example, the video stability may be enhanced by a gravity sensor, an accelerometer sensor, a gyroscope, a mechanic shock absorber, an angular velocity transducer or a dedicated optical anti-shaking device. Due to the need of additional hardware, this video anti-shaking solution will cause increase of device size and/or cost. A software-based video anti-shaking solution may compensate and eliminate jitter in the captured video through a video/image processing technology without increasing additional hardware overheads. However, in the known software-based video anti-shaking solution, the inter-frame motion generally adopts a block matching or feature point matching method, which is, however, rather time-consuming and low-efficiency. Moreover, the known software video anti-shaking solution always cannot handle complex scenarios, for example, presence of a larger moving object, shadow, shield, etc. Particularly, the known software anti-shaking solution cannot distinguish random object movement in video from intentional camera movement, affecting the accuracy of anti-shaking processing.

In view of the foregoing, there is a need for a fast, efficient, and low-cost video anti-shaking solution.

SUMMARY OF THE INVENTION

In order to overcome the above problems in the prior art, the present invention provides a method and apparatus for video anti-shaking.

In one aspect of the present invention, there is provided a method for use in a video anti-shaking. The method comprises: dividing at least one part of a current frame of a video into a plurality of regions; performing a progressive local motion detection for each of the plurality of regions, to determine a local motion vector for the region; and determining a global motion vector for the current frame based on the local motion vectors for the plurality of regions.

In another aspect of the present invention, there is provided an apparatus for use in a video anti-shaking. The apparatus comprises: a frame dividing unit configured to divide at least one part of a current frame of a video into a plurality of regions; a local motion detecting unit configured to perform, for each of the plurality of regions, a progressive local motion detection to determine a local motion vector for the region; and a global motion estimating unit configured to determine a global motion vector for the current frame based on the local motion vectors for the plurality of regions. Other embodiments in this aspect further comprise user equipment comprising this apparatus.

It may be understood from the depiction below that according to embodiments of the present invention, the video anti-shaking processing does not need any additional hardware. Moreover, by progressively determining local motion vectors and determining a global motion vector based on the local motion vectors, inter-frame motion vector may be determined quickly and effectively. In particular, video anti-shaking processing may be performed in real-time. Additionally, embodiments of the present invention can process various scenarios, e.g., presence of shield, shadow, feature loss, moving object, repeated pattern, intentional camera translation, etc. Besides, embodiments of the present invention have a good compatibility and portability, they may be easily combined with various kinds of platforms and devices.

BRIEF DESCRIPTION OF THE ACCOMPANYING DRAWINGS

The above and other objectives, features and advantages of embodiments of the present invention will become more comprehensible through reading the following detailed description with reference to the accompanying drawings. In the figures, several embodiments of the present invention are illustrated in an exemplary, rather than limitative, manner, wherein.

Throughout the drawings, same or corresponding reference numerals represent same or corresponding portions.

DETAILED DESCRIPTION OF THE PREFERRED EMBODIMENTS

Figure 1:
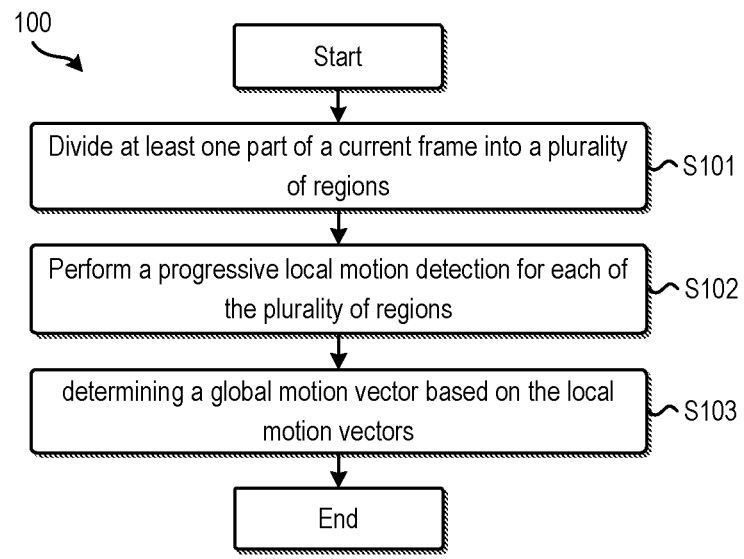
FIG. 1 shows a flow diagram of a method for video anti-shaking according to an exemplary embodiment of the present invention.

As known, the key of video anti-shaking lies in determining a motion vector of a current frame in a video relative to a reference frame. Motion vector expresses displacement of a scenario in a given frame of a video relative to a reference frame, which is fundamental to video anti-shaking processing. Therefore, in order to realize an effective video anti-shaking, the first issue to solve is how to calculate an inter-frame motion vector quickly and accurately. To this end, the core idea of the present invention is to first divide at least a part of a video frame to be processed (called "current frame") into a plurality of regions and determine local motion vectors for these regions adopting a progressive local detection in coarse-to-fine manner. Then, based on a plurality of local motion vectors, a global motion vector for the whole frame may be determined by technical means such as clustering.

Hereinafter, the principle and spirit of the present invention will be described with reference to the several exemplary embodiments shown in the drawings. It should be understood that these embodiments are described only for enabling those skilled in the art to understand better and then implement the present invention, rather than limiting the scope of the present invention in any manner.

Reference is first made to FIG. 1, in which a flow diagram of a method 100 for video anti-shaking according to the exemplary embodiments of the present invention is presented. After the method 100 starts, at step S101, at least one part of the current frame (i.e., a to-be-processed frame) in the video is divided into a plurality of regions. According to some embodiments of the present invention, for example, the current frame may be divided into N*N regions with an equal size, wherein N is an natural number greater than 1, e.g., 3, 4, 5 or any other appropriate value. Alternatively, the current frame may also be divided into different sized regions. The scope of the present invention is not limited in this aspect.

In particular, in some embodiments, the whole current frame may be divided into a plurality of regions. Alternatively, a part of the current frame may be divided into a plurality of regions. For example, in some embodiments, it is allowed to only divide an intermediate part of the current frame (e.g., the part of 70% in the middle or the part of other proportion) into a plurality of regions. In this way, an edge part of the video frame is excluded from the local motion detection and global motion estimation, thereby avoiding potential influence of the motion vector estimation accuracy due to lens distortion, entry or exit of a scene, etc.

Additionally, those skilled in the art would appreciate that the local motion detection and global motion estimation relative to a specific reference frame. According to embodiments of the present invention, the reference frame will be divided into a plurality of regions in a manner identical to the current frame. For example, in an embodiment in which the current frame is divided into N*N regions, the reference frame is also divided, in one-to-one correspondence, into N*N regions. In some embodiments, a preceding frame immediately adjacent to the current frame in the video may be selected as the reference frame. Alternatively, the reference frame may also be a specific frame in the video, e.g., first frame, etc. The scope of the present invention is not limited thereto.

The method 100 proceeds to step S102. Progressive local motion detection is performed for each region in the plurality of regions that are obtained at step S101, to determine a local motion vector for that region. In the context of the present invention, the term "progressive local motion detection" indicates determining the local motion vector for a specific region in a "coarse-to-fine" manner. Additionally, the term "local motion vector" is a motion vector associated with a specific region, which represents displacement of the region relative to a corresponding region in the reference frame.

According to embodiments of the present invention, the progressive local motion detection may be implemented in various manners. For example, in some embodiments, for each region, a coarse, initial local motion vector may be first determined based on projection matching. Then, the initial local motion vector may be refined using a block matching or a feature matching method, obtaining the final local motion vector for the region. Embodiments in this aspect will be described in detail. Alternatively, in some other embodiments, a feature matching or block matching algorithm which has a lower calculation accuracy requirement may be first performed, to calculate the initial local motion vector. Afterwards, a feature matching and/or block matching algorithm with a higher accuracy requirement may be adopted to refine the initial local motion vector. Other progressive local motion detection is also possible, and the scope of the present invention is not limited in this aspect.

Next, at step S103, a global motion vector for the current frame is determined based on the obtained a plurality of local motion vectors for the plurality of regions. Generally, the global motion vector may be determined based on a dominance motion vector in a plurality of local motion vectors. In other words, if local motion vectors exceeding a predetermined number in these local motion vectors are all directed to a certain direction, then the direction may be determined as a direction of the global motion vector. Correspondingly, an average value or a middle value of the sizes of those local motion vectors pointing to that direction may be determined as the size of the global motion vector. Alternatively, in order to enhance the accuracy of global motion estimation, a clustering algorithm may be performed to the local motion vector, to determine the dominance of the local motion vector, and then calculate the global motion vector. Embodiments in this aspect will be described in detail.

By performing steps S101 to S103, the method 100 has completed determination of the global motion vector for the current frame. The method 100 may end after step S103.

Figure 2:
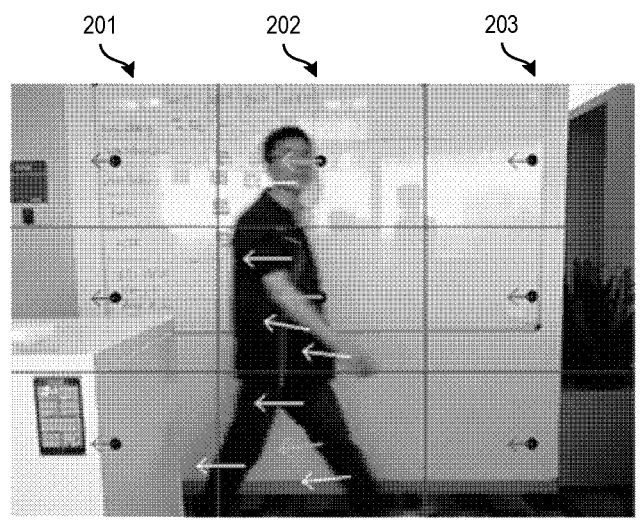
FIG. 2 shows a schematic diagram of a global motion vector for various regions according to exemplary embodiments of the present invention.

According to embodiments of the present invention, the progressive local motion estimation ensures that the local motion vector for this region may be determined quickly or accurately. Moreover, by determining the global motion vector based on the local motion vector, processing of a complex video scene can be effectively improved. As an example, consider the scenario as shown in FIG. 2: a larger moving object (in this example, a walking person) is present in the shot scene while the camera moves. In this case, the traditional motion vector estimation method in the prior art, which is purely based on feature matching or block matching, cannot accurately distinguish movement of the camera from movement of the object. In this way, the calculated motion vector not only reflects change of scenario caused by camera movement, but also will reflect movement of a large-sized object in the scenario. In this way, the effect of subsequent anti-shaking processing based on this motion vector will also be affected.

On the contrary, according to embodiments of the present invention, the global motion vector for a frame is not directly calculated, but determined based on dominant motion vectors in local motion vectors for a plurality of regions. In this way, potential impact caused by a moving object in a scene can be effectively eliminated, such that the global motion vector accurately represents a scene change caused by camera movement. For example the local motion vectors of the three regions in column 201 and of the three regions in column 203 in FIG. 2 are categorized as dominance, which represent scene changes caused by camera movement and are therefore used for calculating the global motion vector. On the contrary, the local motion vectors of the three regions in column 202 are affected by the moving object, which are therefore excluded in calculating the global motion vector. In this way, the obtained global motion vector will be more accurate. Similarly, according to embodiments of the present invention, potential interference of other factors such as shadow, shield and the like may also be eliminated.

Figure 3:
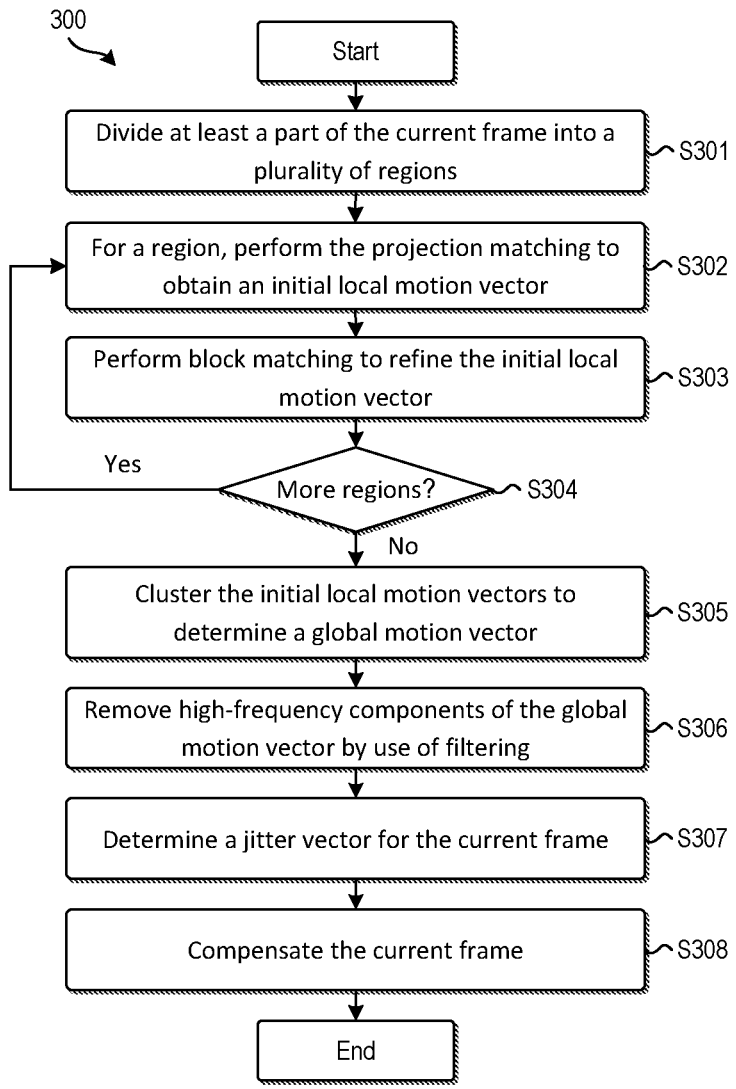
FIG. 3 shows a flow diagram of a method for use in video anti-shaking according to exemplary embodiments of the present invention.

FIG. 3 shows a flow diagram of a method 300 for video anti-shaking according to another exemplary embodiment of present invention. The method 300 may be regarded as a specific implementation of the method 100 depicted above with reference to FIG. 1. After the method 300 starts, at step S301, at least a part of a current frame of a video is divided into a plurality of regions. Step S301 corresponds to step S101 in method 100, which will not be detailed here. Next, the method 300 proceeds to steps S302 and S303, where the progressive local motion detection is performed to determine a local motion vector for each region. It would be appreciated that steps S302 and S303 in method 300 correspond to step S102 in the method 100.

Specifically, at step S302, projection matching is employed to determine an initial local motion vector for a region. As is well known, projection for a region in a frame is summing pixel values (e.g., greyscale values) in a particular direction in the region to thereby convert a two-dimensional image into one-dimensional data. According to embodiments of the present invention, for portioned each region, the current frame and the reference frame may be projected in the horizontal direction and vertical direction, respectively. Then, the initial local motion vector for the region may be calculated based on cross-correlation between the current frame and the reference frame in the horizontal direction/vertical direction.

Figure 4A:
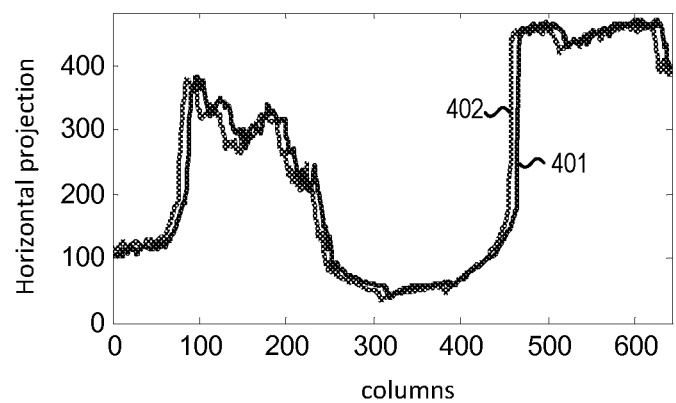
FIGS. 4A and 4B show schematic diagrams of a transversal projection curve and a vertical projection curve according to exemplary embodiments of the present invention.
Figure 4B:
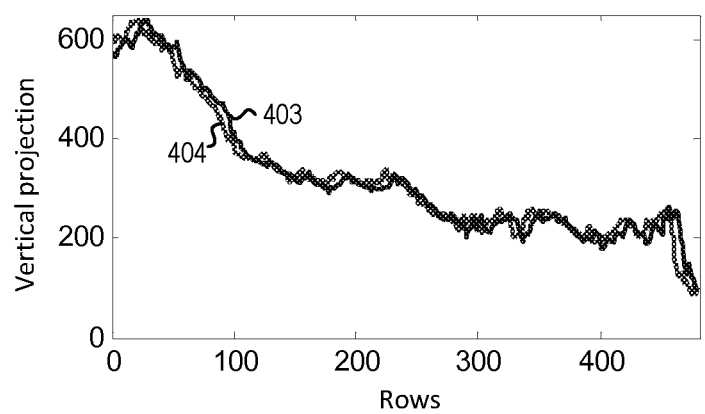

In operation, the current frame and the reference frame are projected on a horizontal direction, respectively. In some embodiments, the projection may be performed for all pixels in the region, for example, performed column by column. Alternatively, projection may also be performed for some pixels in the region, e.g., projection every other row but column by column, thereby enhancing the processing speed. A projection curve may be obtained based on the one-dimensional data set resulting from the projection. With reference to FIG. 4A, the curve 401 represents a projection curve of the current frame in the horizontal direction, while the curve 402 represents a projection curve of the reference frame in the horizontal direction. Similarly, by projecting the current frame and the reference frame in the vertical direction, a vertical projection curve 403 of the current frame and a vertical projection curve 404 of the reference frame may be obtained, as shown in FIG. 4B.

Horizontal cross-correlation between the current frame and the reference frame may be calculated based on the horizontal projection curves 401 and 402, thereby determining inter-frame horizontal displacement. Specifically, a cross-correlation coefficient between two given curves may represent the similarity of the two curves, thereby reflecting the cross-correlation between horizontal projections of the current frame and the reference frame. The calculation method of the cross-correlation coefficient is well known to a technical person in the related field, which will not be detailed here. In this way, a horizontal offset value dx (e.g., by pixel) corresponding to the largest cross-correlation coefficient between the horizontal projection curves 401 and 402 may be determined. Similarly, a vertical offset value dy corresponding to the largest cross-correlation coefficient between the vertical projection curves 403 and 404 may be determined. According to embodiments of the present invention, vector (dx, dy) is determined as the initial motion vector for the region.

Return to FIG. 3. At step S303, block matching is performed for a predetermined proximity determined based on the initial local motion vector, to refine the initial local motion vector, thereby obtaining the final local motion vector for the region. As is well known, for a given to-be-matched image block, the block matching process searches a block most similar to the image block according to a predetermined matching rule within a given search range is just the matching block. Specifically, the coordinate location of a given to-be-matched image block is denoted as (x0, y0) in the current frame. In the reference frame, moving along with the initial local motion vector (dx, dy) results in a corresponding matching block initial location, whose coordinate location is denoted as (x0+dx, y0+dy). Then, with the (x0+dx, y0+dy) as a central point, an accurate location of the matching block is determined in a predetermined proximity in its surrounding, which proximity is just the searching region for the matching block. In some embodiments, the proximity may be a square, sized, for example, to be 5*5 pixels, 7*7 pixels, etc. Alternatively, the proximity may also assume other shape, e.g., rectangle, etc. Additionally, the size of the image block may be determined based on the size of the processed region, e.g., 16*16 pixels, 32*32 pixels, 64*64 pixels, etc. According to embodiments of the present invention, in the block matching at step S303, various currently known or future developed criteria may be adopted as the searching criteria of block matching. For example, in some embodiments, for a to-be-matched image block, a largest cross-correlation coefficient between the image block and those image blocks corresponding to respective points within the to-be-searched region, and adjusting the initial local motion vector based thereupon. As an example, the table 1 below shows a result of block matching based on the initial local motion vector. In the example shown in table 1, the size of the proximity (i.e., to-be-searched region) is set to 5*5 pixels. During operation, for each of the 25 pixels in the proximity, cross-correlation coefficients of its corresponding image block and of the to-be-matched image block are calculated. It may be seen that the point with the largest cross-correlation coefficient within the proximity is just the central point of the proximity (the value of the cross-correlation coefficient is 0.9917). At this point, the initial local motion vector ($d_x$, $d_y$) may be used as the final local motion vector without adjustment.

TABLE 1

| | | | | |
|---|---|---|---|---|
| 0.9796 | 0.9839 | 0.9854 | 0.9845 | 0.9815 |
| 0.9843 | 0.9887 | 0.9904 | 0.9895 | 0.9864 |
| 0.9855 | 0.9900 | 0.9917 | 0.9908 | 0.9878 |
| 0.9823 | 0.9868 | 0.9886 | 0.9879 | 0.9850 |
| 0.9761 | 0.9807 | 0.9827 | 0.9821 | 0.9795 |

As another example, table 2 below shows a result of another block matching. In the matching result shown in Table 2, the point with the largest cross-correlation coefficient is the point in the right bottom of the central point of the proximity (the value of the cross-correlation coefficient is 0.9816). In this way, the initial local motion vector ($d_x$, $d_y$) determined at step S303 is adjusted as ($d_x$+1, $d_y$+1) at step S304 as the local motion vector of the region. It should be noted that the search criteria of block matching are not limited to cross-correlation. Embodiments of the present invention may use various search criteria for block matching, including, but not limited to, absolute error sum, average absolute error, sum of squared difference, mean square error, etc.

TABLE 2

| | | | | |
|---|---|---|---|---|
| 0.9478 | 0.9600 | 0.9662 | 0.9670 | 0.9630 |
| 0.9540 | 0.9667 | 0.9735 | 0.9745 | 0.9706 |
| 0.9581 | 0.9713 | 0.9786 | 0.9799 | 0.9762 |
| 0.9587 | 0.9723 | 0.9799 | 0.9816 | 0.9781 |
| 0.9550 | 0.9688 | 0.9767 | 0.9787 | 0.9755 |

Still with reference to FIG. 3, the method 300 then proceeds to step S304 to determine whether the to-be-processed region is still present. In the case of yes, return to step S302 to continue the execution; otherwise, the method 300 proceeds to step S305. At step S305, a plurality of local motion vectors for a plurality of regions are clustered to determine the global motion vector of the current frame. At step S305, any currently known or future developed clustering algorithm may be employed to cluster the local motion vectors for different regions into two classes. A group of local motion vectors dominant in number are regarded as dominant, i.e., representing change caused by camera movement.

In particular, in some embodiments, local motion vectors may be clustered using the K-means clustering algorithm. In such an embodiment, two local motion vectors may be originally selected as a clustering center, i.e., set K=2. The clustering center may select according to any appropriate manner, e.g., random selection, selecting two local motion vectors spaced enough far, etc. Then, a plurality of iterative clustering process starts. In some embodiments of the present invention, the execution number of the clustering algorithm may be set as a predetermined threshold number, e.g., three, thereby further clustering the dominant motion vector in the last clustering result. In this way, the global motion vector may be effectively estimated. Compared with the random sample consensus (RANSAC) algorithm or a support vector machine, which are frequently used in video movement estimation, such multi-iteration K-means algorithm can cluster the local motion vectors quickly, while guaranteeing the accuracy of the global motion vector estimation. It should be noted that the K-means algorithm is only an example of a clustering algorithm, without suggesting any limitations of the scope of the present invention. Any currently known or future developed clustering algorithm may be used in combination with embodiments of the present invention.

After the clustering algorithm is completed, if the number of local motion vectors in one class is apparently larger than another one, then a median value of all local motion vectors in the class whose number is dominant may be calculated, and the resulting vectors are used as a global motion vector for the frame. On the other hand, if the numbers of local motion vectors included in the two classes obtained from clustering are equivalent, the media value vectors of the local motion vectors in the two classes may be calculated, respectively. In the resulting two median value vectors, the vector closer to zero is determined as the global motion vector for the frame. It should be noted that it is only exemplary, and embodiments of the present invention may also adopt other tie-break rules. For example, one of the two vectors may be randomly selected as the global motion vector. The scope of the present invention is not limited in this aspect.

The method 300 then proceeds to step S306, where the global motion vector resulting from step S305 is filtered to remove a high-frequency component of the global motion vector. Filtering of the global motion vector helps distinguish intentional camera movement from undesired camera jitter. A reason hypothesis is that intentional camera movement is generally relatively mild, while undesired camera jitter is always precipitate. Based on this hypothesis, according to embodiments of the present invention, a high-frequency component, in the global motion vector, corresponding to the camera jitter, will be removed at step S306.

According to embodiments of the present invention, at step S306, various currently known or future developed filters may be used to filter the global motion vector. Examples of filters that may be used in connection with embodiments of the present invention include, but not limited to, a median value filter, a mean value filter, a wavelet filter, etc. In particular, in some embodiments of the present invention, an improved wavelet filter may be used to filter the global motion vector. As is already known, the wavelet filter includes a wavelet hard threshold filter and a wavelet soft threshold filter. The wavelet hard threshold filter may be represented as:

$$c' = \begin{cases} c, & |c| \geq T \\ 0 & |c| \leq T \end{cases}$$

where c and c' may represent the wavelet coefficient values before and after the filter. the wavelet soft threshold filter may be represented as:

$$c' = \begin{cases} c - T & c \geq T \\ 0 & |c| \leq T \\ c + T & c \leq -T \end{cases}$$

Figure 5:
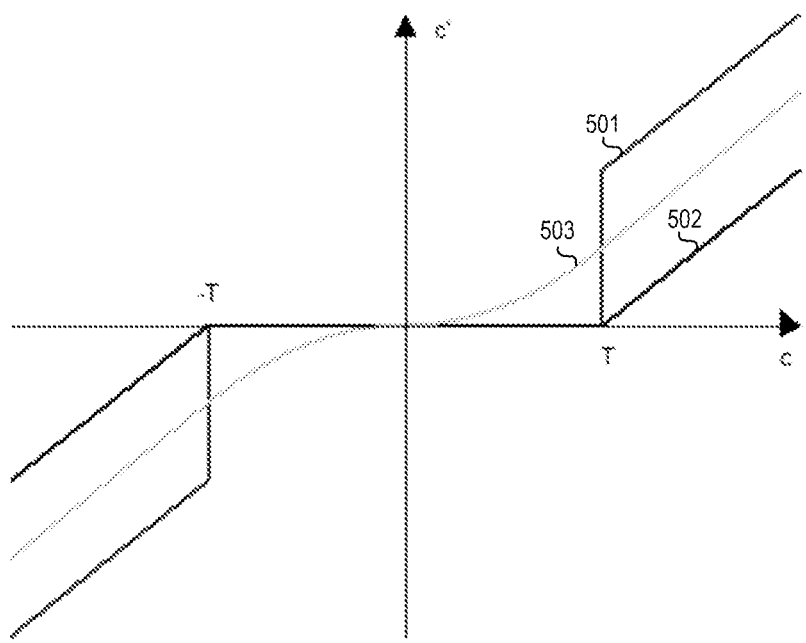
FIG. 5 shows a schematic diagram of a motion filter according to exemplary embodiments of the present invention.

According to embodiments of the present invention, the wavelet soft threshold filter is further improved. Specifically, the improved wavelet soft threshold filter according to embodiments of the present invention may be represented as:

$$c' = \begin{cases} c - T + \lambda T^2 & c \geq T \\ \lambda c^2 & 0 < c < T \\ -\lambda c^2 & -T < c < 0 \\ c + T - \lambda T^2 & c \leq -T \end{cases}$$

where λ is a smoothing coefficient, whose value range is for example [−10, 10] or falls within any other appropriate scope. The filter is continuous and conductive. The global motion vector subject to this filter processing will become more smoothing. FIG. 5 shows a schematic diagram of a hard threshold, a soft threshold, and a soft threshold continuous wavelet filter according to embodiments of the present invention. It may be seen that compared with the traditional hard threshold wavelet filter 501 and the soft threshold wavelet filter 502, the smooth wavelet soft threshold filter 503 according to embodiments of the present invention will have a smoother filtering result.

Next, at step S307, a jitter vector for the current frame is determined based on the global motion vector obtained at step S305 and a filtered global motion vector obtained at step S306. Based on this jitter vector, the current frame is compensated at step S308. As an example, in some embodiments of the present invention, the jitter vector may be decomposed in the horizontal direction and vertical direction, thereby determining a horizontal jitter value and a vertical direction value associated with the current frame. Correspondingly, the current frame may be moved or tailored based on the horizontal jitter value and the vertical jitter value, thereby offsetting the jitter in the current frame and enhancing stability in visual effect.

In particular, embodiments of the present invention can support real-time video anti-shaking. According to embodiments of the present invention, delay of anti-shaking processing is related to the size of the filter used at step S306. Suppose the size of the filter is m+1 (m is an even number), then the motion compensation for the current frame will delay m/2 frame. For example, in an m=10 embodiment, the output video viewed by the user for example in a viewfinder of the device will delay 5 seconds. If the frame rate is 30 fps, the output video will delay 0.167 second, which is hardly perceivable in bare eyes of human beings.

Figure 6:
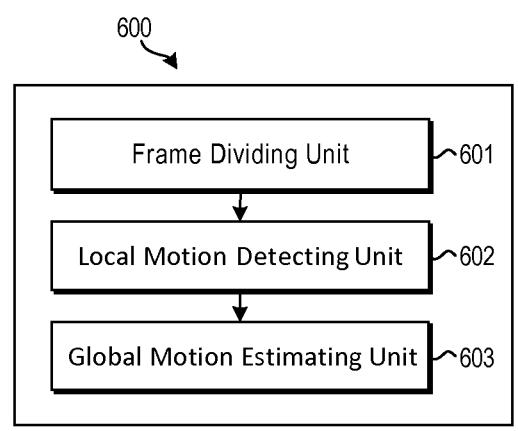
FIG. 6 shows a block diagram of an apparatus for use in video anti-shaking according to exemplary embodiments of the present invention.

Reference is now made to FIG. 6 where a block diagram of an apparatus 600 for use in video anti-shaking according to exemplary embodiments of the present invention is presented. As shown in the figure, the apparatus 600 comprises: a frame dividing unit 601 configured to divide at least one part of a current frame of a video into a plurality of regions; a local motion detecting unit 602 configured to perform, for each of the plurality of regions, a progressive local motion detection to determine a local motion vector for the region; and a global motion estimating unit 603 configured to determine a global motion vector for the current frame based on the local motion vectors for the plurality of regions.

In some embodiments of the present invention, the local motion detecting unit 602 comprises: a projection matching unit configured to perform a projection matching to the region, to determine an initial local motion vector for the region; and a block matching unit configured to perform block matching for a predetermined proximity of the initial local motion vector, to refine the initial local motion vector into the local motion vector. In particular, in some embodiments of the present invention, the projection matching unit may comprise: a horizontal correlation determining unit configured to determine a horizontal cross-correlation between a horizontal projection of the current frame and the horizontal projection of the reference frame; and a vertical correlation determining unit configured to determine a vertical cross-correlation between a vertical projection of the current frame and a vertical projection of the reference frame. In such an embodiment, the projection matching unit is configured to determine the initial local motion vector based on the horizontal cross-correlation and the vertical cross-correlation.

In some embodiments of the present invention, the global motion estimating unit 603 may comprise a clustering unit configured to cluster the local motion vectors for the plurality of regions. In some embodiments of the present invention, the clustering unit may comprises a K-means clustering unit configured to divide the local motion vectors for the plurality of regions using a K-means clustering algorithm, wherein the execution number the K-means clustering algorithm is set as predetermined threshold number.

In some embodiments of the present invention, the apparatus 600 may further comprise a filtering unit configured to filter the global motion vector so as to remove a high-frequency component of the global motion vector. In some embodiments of the present invention, the filtering unit may comprise a wavelet filtering unit configured to filter the global motion vector using a smooth wavelet soft threshold filter. In some embodiments of the present invention, the apparatus 600 may further comprise: a jitter vector determining unit configured to determine a jitter vector for the current frame based on the global motion vector and the filtered global motion vector; and a compensating unit configured to compensate the current frame based on the jitter vector.

It should be understood that for the sake of clarity, FIG. 6 does not show optional units and sub-units of the apparatus 600. However, it should be understood that various features as described with reference to FIGS. 1-5 are likewise applicable to the apparatus 600, which are therefore not detailed here. Moreover, the term "unit" used here may be a hardware module or a software module. Accordingly, apparatus 600 may be implemented in various forms. For example, in some embodiments apparatus 600 may be implemented using software and/or firmware partially or completely, e.g., implemented as a computer program product embodied on a computer readable medium. Alternatively or additionally, apparatus 600 may be implemented partially or completely based on hardware, for example, implemented as an integrated circuit (IC) chip, application-specific integrated circuit (ASIC), system on chip (SOC) or field programmable gate array (FPGA). The scope of the present invention is not limited in this regard.

Figure 7:
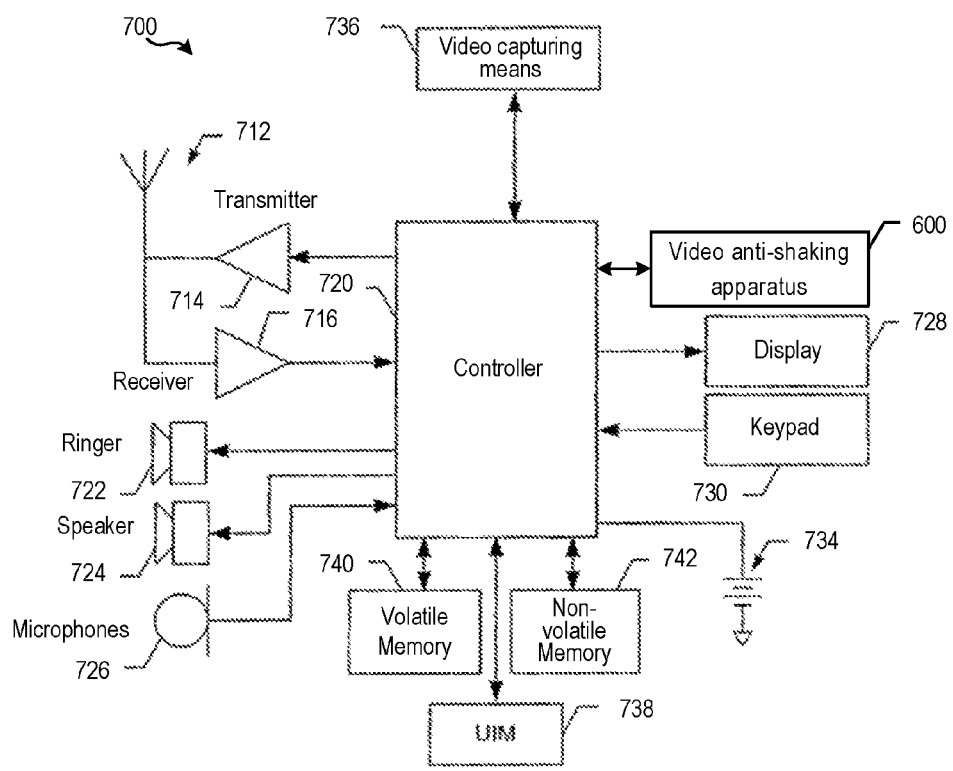
FIG. 7 shows a block diagram of user equipment in which exemplary embodiments of the present invention may be implemented therein.

FIG. 7 shows a schematic block diagram of user equipment 700 in which the embodiments according to the present invention may be implemented. The equipment 700 may be a mobile device having unlimited communication capabilities. However, it should be understood, it is only exemplary and non-limiting. Other user equipment types may also easily implement embodiments of the present invention, such as a portable digital assistant (PDA), pager, mobile computer, mobile TV, a gaming apparatus, a laptop computer, a camera, a video camera, GPS device and other kind of voice and text communication system. The user device of a fixed type may likewise simply use the embodiments of the prevent information.

Apparatus 700 comprises one or more antennas 700 operable to communicate with a transmitter 714 and a receiver 716. The apparatus 700 further comprises at least one processor controller 720. It should be understood, the controller 720 comprises a circuit necessary to perform the function of the mobile terminal 700. For example, the controller 720 may comprise a digital signal processor device, a microprocessor device, an A/D converter, and other support circuits. The control and signal processing functions of the apparatus 700 are distributed based on respective capabilities of these devices. The apparatus 700 may further comprise a user interface, for example, may include a ringer 722, a speaker 724, a loudspeaker 726, a display 728, and a keypad 730. All of the above devices are coupled to the controller 720.

In particular, the apparatus 700 may also comprise a video capturing means 736 for capturing static image and/or video, and an apparatus 600 for video anti-shaking according to embodiments of the present invention. Additionally, the apparatus 700 further comprises a battery 734, such as a vibrating battery group, for supplying power to various circuits required for manipulating the mobile terminal 700 and alternatively, provides mechanical vibration as detectable output. The apparatus 700 further comprises a user identification module (UIM) 738. The UIM 738 is generally a memory device with a built-in processor. The UIM 738 may, for example, include a subscriber identification module (SIM), a universal integrated circuit card, a universal subscriber identification module (USIM) or a movable subscriber identification module (R-UIM), etc. The UIM 738 may comprise a card connection detection module according to embodiments of the present invention.

The apparatus 700 further comprises a memory. For example, the mobile terminal 700 may comprise a volatile memory 740, e.g., a volatile random access memory (RAM) for temporally storing data in the cache region. The apparatus 700 may also comprise other non-volatile memory 742 that may be embedded or movable. The non-volatile memory 742 may, additionally or alternatively, for example, comprise EEPROM and a flash disk, etc. The memory may store any of the plurality of information segments and the data used in the apparatus 700, so as to perform the functions of the apparatus 700. It should be understood that the block diagrams in FIG. 7 are only for illustration purposes, not intended to limit the scope of the present invention. In some cases, some devices may be added or reduced as required.

Only for the illustration purpose, several exemplary embodiments of the present invention have been described above. Embodiments of the present invention may be implemented by hardware, software or a combination of the software and combination. The hardware part may be implemented using a dedicated logic; the software part may be stored in the memory, executed by an appropriate instruction executing system, e.g., a microprocessor or a dedicatedly designed hardware. A person of normal skill in the art may understand that the above apparatus and method may be implemented using a computer-executable instruction and/ or included in processor control code. In implementation, such code is provided on a medium such as magnetic disk, CD or DVD_ROM, a programmable memory such as read-only memory (firmware), or a data carrier such as optical or electronic signal carrier. The system of the present invention can be implemented by a very large scale integrated circuit or gate array, semiconductor such as logic chips and transistors, or hardware circuitry of programmable hardware devices like field programmable gate arrays and programmable logic devices, or implemented by various kinds of processor-executable software, or implemented by a combination of the above hardware circuits and software, such as firmware.

It is to be understood that although several units or sub-units of the apparatus have been mentioned in the above detailed description, such division is merely exemplary and not mandatory. In fact, according to embodiments of the present invention, the features and functions of two or more modules described above may be embodied in one module. On the contrary, the features and functions of one module described above may be embodied by a plurality of modules. In addition, although in the accompanying drawings operations of the method of the present invention are described in specific order, it is not required or suggested these operations be necessarily executed in the specific order or the desired result should be achieved by executing all illustrated operations. On the contrary, the steps depicted in the flowcharts may change their execution order. Additionally or alternatively, some steps may be omitted, a plurality of steps may be combined into one step for execution, and/or one step may be decomposed into a plurality of steps for execution.

Although the present invention has been described with reference to several embodiments, it is to be understood the present invention is not limited to the embodiments disclosed herein. The present invention is intended to embrace various modifications and equivalent arrangements comprised in the spirit and scope of the appended claims. The scope of the appended claims accords with the broadest interpretation, thereby embracing all such modifications and equivalent structures and functions.

The invention claimed is:

1. A method for use in video anti-shaking, comprising:
dividing at least one part of a current frame of a video into a plurality of regions;
categorizing at least one region as a dominant region representing a scene change caused by a camera movement;
performing, for each of a number of the regions, a progressive local motion detection to determine a local motion vector for the region; and
determining a global motion vector for the current frame based on the local motion vectors for the dominant region while excluding local motion vectors of one or more regions that are affected by a moving object from global motion vector determination, wherein determining the global motion vector comprises performing a comparison of a number of local motion vectors in a first class with a number of local motion vectors in a second class; and calculating one or more median values of the local motion vectors based on a result of the comparison and a total number of the local motion vectors for the dominant region.

2. The method of claim 1, wherein performing the progressive local motion detection comprises:
performing projection matching for the region to determine an initial local motion vector for the region; and
performing block matching for a predetermined proximity for the initial local motion vector to refine the initial local motion vector into the local motion vector.

3. The method of claim 2, wherein performing the projection matching for the region comprises:
determining a horizontal cross-correlation between a horizontal projection of the current frame and a horizontal projection of a reference frame;
determining a vertical cross-correlation between a vertical projection of the current frame and a vertical projection of the reference frame; and
determining the initial local motion vector based on the horizontal cross-correlation and the vertical cross-correlation.

4. The method of claim 1, wherein determining the global motion vector for the current frame comprises:
clustering the local motion vectors for the plurality of regions.

5. The method of claim 4, wherein clustering the local motion vectors for the plurality of regions comprises:
clustering the local motion vectors for the plurality of regions into two classes using a K-means clustering algorithm, wherein execution number of the K-mean value clustering algorithm is set as predetermined threshold number.

6. The method of claim 1, further comprising:
filtering the global motion vector to remove a high-frequency component of the global motion vector.

7. The method of claim 6, wherein filtering the global motion vector comprises:
filtering the global motion vector using a smooth wavelet soft threshold filter.

8. The method of claim 7, further comprising:
calculating a jitter vector for the current frame based on the global motion vector and filtered global motion vector; and
compensating the current frame based on the jitter vector.

9. An apparatus for use in video anti-shaking, comprising:
at least one processor and at least one memory including a computer program code, wherein the at least one memory including the computer program code are configured, with the at least one processor, to cause the apparatus to:
divide at least one part of a current frame of a video into a plurality of regions;
categorize at least one region as a dominant region representing a scene change caused by a camera movement;
perform, for each of a number of the regions, a progressive local motion detection to determine a local motion vector for the region; and
determine a global motion vector for the current frame based on the local motion vectors for the dominant region while excluding local motion vectors of one or more regions that are affected by a moving object from global motion vector determination, wherein determining the global motion vector comprises performing a comparison of a number of local motion vectors in a first class with a number of local motion vectors in a second class; and calculating one or more median values of the local motion vectors based on a result of the comparison and a total number of the local motion vectors for the dominant region.

10. The apparatus of claim 9, wherein the at least one memory including the computer program code are configured, with the at least one processor, to further cause the apparatus to:
perform projection matching for the region, to determine an initial local motion vector for the region; and
perform block matching for a predetermined proximity for the initial local motion vector to refine the initial local motion vector into the local motion vector.

11. The apparatus of claim 10, wherein the at least one memory including the computer program code are configured, with the at least one processor, to further cause the apparatus to:
determine a horizontal cross-correlation between a horizontal projection of the current frame and a horizontal projection of a reference frame; and
determine a vertical cross-correlation between a vertical projection of the current frame and a vertical projection of the reference frame,
wherein the initial local motion vector is determined based on the horizontal cross-correlation and the vertical cross-correlation.

12. The apparatus of claim 9, wherein the at least one memory including the computer program code are configured, with the at least one processor, to further cause the apparatus to:
cluster the local motion vectors for the plurality of regions.

13. The apparatus of claim 12, wherein the at least one memory including the computer program code are configured, with the at least one processor, to further cause the apparatus to:
cluster the local motion vectors for the plurality of regions into two classes using a K-means clustering algorithm, wherein execution number of the K-mean value clustering algorithm is set as predetermined threshold number.

14. The apparatus of claim 9, wherein the at least one memory including the computer program code are configured, with the at least one processor, to further cause the apparatus to:
filter the global motion vector to remove a high-frequency component of the global motion vector.

15. The apparatus of claim 14, wherein the at least one memory including the computer program code are configured, with the at least one processor, to further cause the apparatus to:
filter the global motion vector using a smooth wavelet soft threshold filter.

16. The apparatus of claim 15, wherein the at least one memory including the computer program code are configured, with the at least one processor, to further cause the apparatus to:
determine a jitter vector for the current frame based on the global motion vector and filtered global motion vector; and
compensate the current frame based on the jitter vector.

17. A computer program product comprising a computer readable non-transitory storage medium embodying program code portions therein, the program code portions being configured to, upon execution, direct an apparatus to at least:
divide at least one part of a current frame of a video into a plurality of regions;
categorize at least one region as a dominant region representing a scene change caused by a camera movement;
perform, for each of a number of the regions, a progressive local motion detection to determine a local motion vector for the region; and
determine a global motion vector for the current frame based on the local motion vectors for the dominant region while excluding local motion vectors of one or more regions that are affected by a moving object from global motion vector determination, wherein determining the global motion vector comprises performing a comparison of a number of local motion vectors in a first class with a number of local motion vectors in a second class; and calculating one or more median value of the local motion vectors based on a result of the comparison and a total number of the local motion vector for the dominant region.

* * * * *